United States Patent
Lillie et al.

(10) Patent No.: US 7,894,377 B2
(45) Date of Patent: Feb. 22, 2011

(54) METHOD AND SYSTEM FOR GROUP COMMUNICATIONS

(75) Inventors: Ross Lillie, Hoffman Estates, IL (US); Matthew Keller, Algonquin, IL (US); Michael Korus, Eden Prarie, MN (US); Donald Newberg, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 2842 days.

(21) Appl. No.: 10/334,521

(22) Filed: Dec. 31, 2002

(65) Prior Publication Data

US 2004/0125802 A1 Jul. 1, 2004

(51) Int. Cl.
*H04H 20/71* (2008.01)
*H04L 12/56* (2006.01)
*H04L 12/66* (2006.01)

(52) U.S. Cl. .................. 370/312; 370/352; 370/390

(58) Field of Classification Search ................. 370/312, 370/352–356, 390, 466
See application file for complete search history.

(56) References Cited

U.S. PATENT DOCUMENTS

| | | |
|---|---|---|
| 5,434,852 A | 7/1995 | LaPorta et al. |
| 5,517,494 A | 5/1996 | Green |
| 6,005,848 A | 12/1999 | Grube et al. |
| 6,108,705 A | 8/2000 | Svennevik et al. |
| 6,275,852 B1 | 8/2001 | Filepp |
| 6,438,114 B1 | 8/2002 | Womack et al. |
| 6,449,260 B1 | 9/2002 | Sassin et al. |
| 6,477,150 B1 | 11/2002 | Maggenti et al. |
| 6,529,882 B1 | 3/2003 | Park et al. |
| 6,823,364 B1 * | 11/2004 | Sollee et al. ................. 709/205 |
| 6,845,389 B1 * | 1/2005 | Sen et al. .................... 709/204 |
| 6,934,279 B1 * | 8/2005 | Sollee et al. ................. 370/352 |
| 6,301,245 B1 | 10/2005 | Luzeski et al. |
| 6,965,614 B1 * | 11/2005 | Osterhout et al. ........... 370/466 |

(Continued)

FOREIGN PATENT DOCUMENTS

JP 05-308634 11/1993

(Continued)

OTHER PUBLICATIONS

Canadian Office Action dated May 17, 2010 corresponding to Canadian Application No. 2510631, a foreign counterpart.

(Continued)

*Primary Examiner*—Pankaj Kumar
*Assistant Examiner*—Marcus R Smith
(74) *Attorney, Agent, or Firm*—Valerie M. Davis; Anthony P. Curtis (57) ABSTRACT

A method and system for group communications is described. The system includes a plurality of endpoints and at least one group entity that receives from an initiating endpoint, using a transactional protocol, a first message requesting an initiation of a session between a plurality of endpoints affiliated with a group that correlates to the group entity. The group entity further: causes the session to be accepted in order to start the session; upon the acceptance and start of the session causes the presence of the session to be communicated, using a broadcast protocol, to the plurality of endpoints affiliated with the group; and communicates to the initiating endpoint, using the transactional protocol, the acceptance of the session.

19 Claims, 5 Drawing Sheets

U.S. PATENT DOCUMENTS

| | | | |
|---|---|---|---|
| 7,079,495 B1 * | 7/2006 | Pearce et al. | 370/260 |
| 7,366,780 B2 | 4/2008 | Keller et al. | |
| 7,502,837 B2 | 3/2009 | Westman et al. | |
| 2002/0037735 A1 | 3/2002 | Maggenti et al. | |
| 2002/0061760 A1 | 5/2002 | Maggenti et al. | |
| 2002/0061761 A1 | 5/2002 | Maggenti et al. | |
| 2002/0061762 A1 | 5/2002 | Maggenti et al. | |
| 2002/0077136 A1 | 6/2002 | Maggenti et al. | |
| 2002/0086665 A1 | 7/2002 | Maggenti et al. | |
| 2002/0998840 | 7/2002 | Hanson | |
| 2002/0119821 A1 | 8/2002 | Sen | |
| 2002/0141383 A1 * | 10/2002 | Schaefer et al. | 370/352 |
| 2002/0150091 A1 | 10/2002 | Lopponen et al. | |
| 2002/0150092 A1 | 10/2002 | Bontempi et al. | |
| 2002/0156903 A1 | 10/2002 | Bach Corneliussen | |
| 2002/0177466 A1 | 11/2002 | Laurila et al. | |
| 2003/0079037 A1 * | 4/2003 | Donnelly et al. | 709/232 |
| 2003/0095510 A1 * | 5/2003 | Dorenbsoch | 370/260 |

FOREIGN PATENT DOCUMENTS

| | | |
|---|---|---|
| WO | WO 01/67674 A2 | 9/2001 |
| WO | WO 01/67675 A2 | 9/2001 |
| WO | WO 01/67787 A2 | 9/2001 |

OTHER PUBLICATIONS

European Office Action dated Sep. 30, 2010 corresponding to EPC Application No. 03799997.6, a foreign counterpart in related U.S. Appl. No. 10/334,439 .

European Office Action dated Feb. 18, 2010 corresponding to EPC Application No. 03814887.0, a foreign counterpart in related U.S. Appl. No. 10/334,523 .

EPC Search Report dated Nov. 9, 2009 corresponding to European Application No. 03814887.0, a foreign counterpart in related U.S. Appl. No. 10/334,523.

Israel Office Action dated Aug. 3, 2009 corresponding to Israel Application No. 169234, a foreign counterpart of related U.S. Appl. No. 10/334,577.

Israel Office dated Sep. 6, 2009 corresponding to Israel Application No. 169106, a foreign counterpart.

Japan Office Action dated Sep. 8, 2009 corresponding to Japan Application No. 2004-565567, a foreign counterpart of related U.S. Appl. No. 10/334,439 .

Roach Dynamicsoft A B: "Session Initation Protocol (SIP)-Specific Event Notification; rfc3265.txt"IETF Standard, Internet Engineering Task Force, IETF, CH, Jun. 1, 2002, XP015009043ISSN: 0000-0003.

Reuven Cohen et al., Video on Demand Session Management: IEEE Journal on Selected Areas in Communications, IEEE Service Center, Piscataway, US, vol. 14, No. 6, Aug. 1, 1996, XP011054515 ISSN: 0733-8716.

* cited by examiner

METHOD AND SYSTEM FOR GROUP COMMUNICATIONS

REFERENCE TO RELATED APPLICATIONS

The present application is related to the following U.S. applications commonly owned together with this application by Motorola, Inc.:

Ser. No. 10/334,577, filed Dec. 31, 2002, titled "System and Method for Controlling and Managing Sessions Between Endpoints in a Communications System" by Keller, et al.;

Ser. No. 10/334,635, filed Dec. 31, 2002, titled "Methods for Managing a Pool of Multicast Addresses and Allocating Addresses in a Communications System" by Newberg, et al.;

Ser. No. 10/334,523, filed Dec. 31, 2002, titled "Apparatus and Method for Controlling and Managing Individual Directed Sessions in a Communications System" by Lillie, et al; and Ser. No. 10/334,439, filed Dec. 31, 2002, titled "Methods for Affiliating Endpoints with a Group and Determining Common Communication Capabilities for the Affiliated Endpoints" by Newberg, et al.

FIELD OF THE INVENTION

The present invention relates generally to group communications and more specifically to a method and system for initiating, controlling, and terminating a session between a plurality of endpoints affiliated with a group that correlates to a group entity.

BACKGROUND OF THE INVENTION

Multimedia and group communications have become an important aspect of telecommunications, and the demand for such continues to increase. For instance, the Final Report of the Public Safety Wireless Advisory Committee to the Federal Communications Committee ("FCC"), dated 1996, expressed the critical need for communication resources for multimedia. Subsequently in 1998, the FCC established a band plan for the 764 MHz frequencies that included spectrum set aside for public safety wideband. In addition, the Internet Engineering Task Force ("IETF") has developed a suite of protocols that are designed for use in multimedia communications. These protocols include a Session Initiation Protocol ("SIP"), a Session Announcement Protocol ("SAP"), and a Session Description Protocol ("SDP").

Since its approval in early 1999 as an official standard, SIP has gained tremendous market acceptance for signaling communications services on the Internet. As such, numerous products incorporate the SIP standard, including but not limited to SIP desktop telephones, SIP telephony servers, and personal computing ("PC") devices running SIP applications. SIP is a text-based signaling transactional protocol, similar to Hypertext Transfer Protocol ("HTTP") and Simple Mail Transfer Protocol ("SMTP"), and works in the Application layer of the Open Systems Interconnection ("OSI") communications model. A SIP message is used to initiate an interactive communications session, such as voice, video, and chat, between users (also referred to herein as callers) in a communications network. Each user is typically associated with a communications device (also referred to herein as a terminal device or an endpoint) that is connected to the network.

SIP is not only used to initiate sessions, SIP messages are also used to terminate and to modify sessions. SIP does not, however, actually define what a "session" is, e.g., which Internet Protocol ("IP") channel (addresses and ports), media codec specification, floor control channels, etc., are to be used during the session. This is described by content carried in the SIP messages. SIP conveys information about the protocol used to describe the session through multipurpose Internet mail extensions (MIME), widely used in web and e-mail services to describe content (HTML, audio, video, etc.). The most common protocol used to describe sessions is SDP, described in the IETF Request for Comments [RFC]2327. SIP can also be used to negotiate a common format for describing sessions, so that other protocols besides SDP can be used.

SIP is based on the request-response paradigm. Thus, to initiate a session, a caller who is associated with an initiating endpoint sends a request (called an INVITE) addressed to the user, associated with a recipient endpoint, that the caller wants to talk to. In SIP, addresses are Uniform Resource Locators ("URLs"). SIP defines a URL format that is very similar to the popular mailto URL. For instance, if the user's e-mail address is janedoe@company.com, the SIP URL would be sip:janedoe@company.com. Once the user has been located and the session description delivered, SIP is used to convey the response to the session initiation (accept, reject, etc.). If accepted (via a SIP OK), the session is now active, wherein a SIP ACK is then sent from the initiating endpoint to the recipient endpoint.

In SIP, a successful INVITE/OK/ACK exchange creates a SIP control dialog (also referred to as a SIP dialog, a call leg or a SIP transaction). Once a session is active, SIP can be used to modify the session as well. To modify a session, the initiating endpoint simply re-initiates the session, sending the same message as the original, but with a new session description. For this reason, modification of sessions (which includes things like adding and removing audio streams, adding video, changing codecs, hold and mute) are easily supported with SIP, so long as the session description protocol can support them (SDP supports all of the above). Finally, SIP can be used to terminate the session. Sending a SIP BYE message performs this function.

SIP is good for controlling media sessions and for establishing media sessions between an initiating endpoint and one recipient endpoint or a small group of recipient endpoints. However, SIP is not readily scalable for establishing media sessions between an initiating endpoint and a large group of recipient endpoints. This is because in standard SIP, three messages (INVITE/OK/ACK) must be sent between the initiating endpoint and each recipient endpoint in a given group. If a group is particularly large, this excessive messaging could cause bandwidth and timing problems, which is not desirable for communications that are time sensitive, e.g., as in the area of public safety.

SAP, on the other hand, is a broadcast protocol that is defined in RFC2974. SAP is used by a session directory server, referred to as a SAP announcer, to announce multicast based conferences, wherein, for instance, multimedia files (usually audio and video streams) are sent to multiple users at the same time somewhat as radio and TV programs are broadcast over airwaves. Although SAP is scalable for large group communications, a shortcoming of how SAP is currently implemented is that it has a low update or announcement rate that does not support dynamically assigned sessions.

Thus, there exists a need for a method and a system architecture that supports dynamically assigned sessions for group communication between a plurality of endpoints and that is scalable for any size group and overcomes the bandwidth and timing problems in the current art.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

Figure 1:
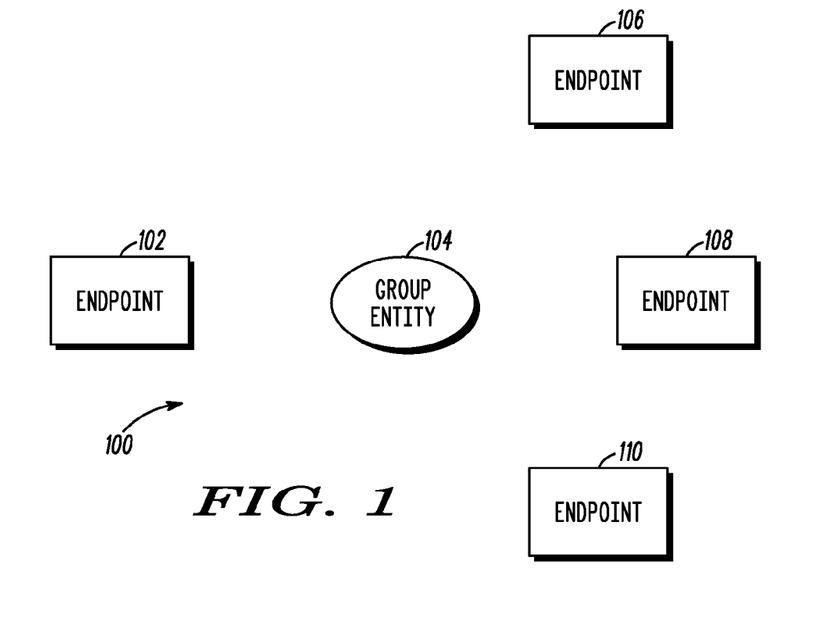
FIG. 1 is a block diagram illustrating a system that uses a method for group communications in accordance with the present invention.

FIG. 1 illustrates a communications network system 100 that uses a method for group communications in a network of users, in accordance with the present invention. System 100 comprises an endpoint 102 associated with a user 1 (not shown) and a terminal 1 binding to the network, an endpoint 106 associated with a user 2 (not shown) and a terminal 2 binding to the network, an endpoint 108 associated with a user 3 (not shown) and a terminal 3 binding to the network, an endpoint 110 associated with a user 4 (not shown) and a terminal 4 binding to the network, and a group entity 104 that represents a logical point of control for all media sessions initiated with the endpoints affiliated with group 1. Group 1, when composed, will include a plurality of users and their associated terminal devices that have a need to share information between the users affiliated with the group. In addition, servers and other groups, if any, in the network can also affiliate with group 1. Each terminal device 1, 2, 3 and 4 may be, but is not limited to, one of the following communications devices: cellular telephones, wireless Personal Data Assistants, mobile computers, and desktop terminals.

Group entity 104 is preferably a specialized SIP entity that combines a SIP user agent client, a SIP user agent server, and a SAP session directory into a single entity to provide a single point of control and to transform unicast SIP signaling to broadcast SAP signaling for increased scalability and performance. Session initiation, modification, and termination are controlled by SIP messages addressed to the group entity. The group entity maintains a session directory of all active sessions within a group's context and informs affiliated endpoints of the current state of any sessions via unicast SIP signaling and broadcast SAP announcements.

System 100 is simplified for purposes of illustrating the present invention. However, those of ordinary skill in the art will realize that system 100 may be designed to include a much larger number of users and associated terminal devices. System 100 may be, for instance, a dispatch system for use in public safety that includes a plurality of dispatch groups of varying sizes, wherein each dispatch group has a correlating group entity for mediating sessions between a plurality of endpoints affiliated with the respective group. The dispatch system may also include additional entities not shown in FIG. 1 to further increase the system's efficiency. These additional entities may be configured to assist the group entities in mediating sessions for group communications.

Figure 2:
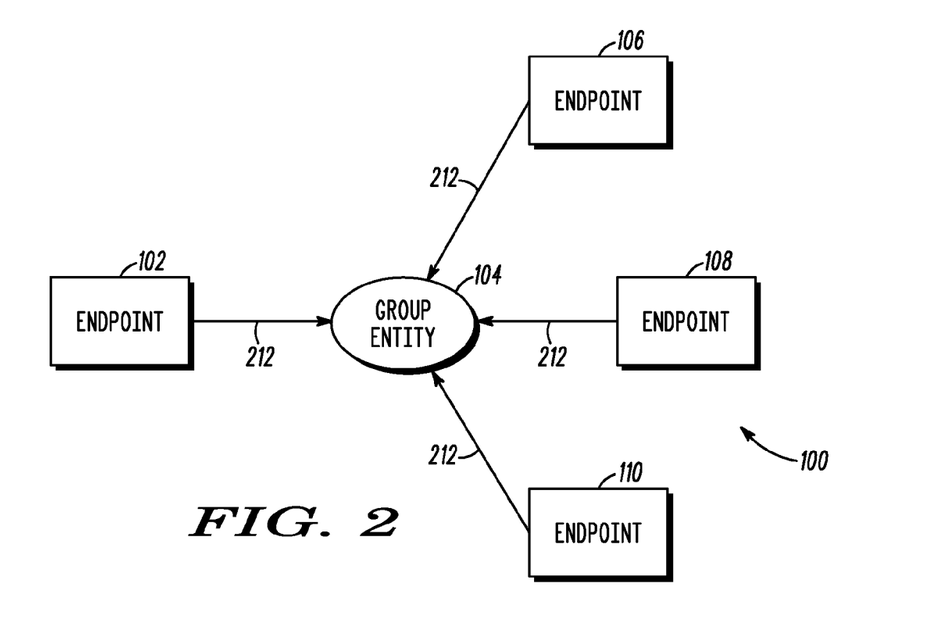
FIG. 2 is a block diagram illustrating a plurality of endpoints affiliated with a group that correlates to a given group entity, in accordance with the present invention.

In system 100, one or more users and their corresponding terminals are made known to group entity 104 and thereby affiliated with group 1, for purposes of, e.g., group communications and media exchange, through a registration process. FIG. 2 illustrates endpoints 102, 106, 108 and 110 registering with group entity 104. The registration process is illustrated in FIG. 2 by the arrow labeled 212 pointing from each endpoint to group entity 104. Registration with group entity 104 serves to provide group entity 104 with knowledge of each terminal, including, e.g., the capabilities of each terminal. Each endpoint registers with group entity 104 preferably through a SIP REGISTER message. However, those of ordinary skill in the art will realize that registration with group entity 104 may be accomplished through any other suitable registration process.

Figure 3:
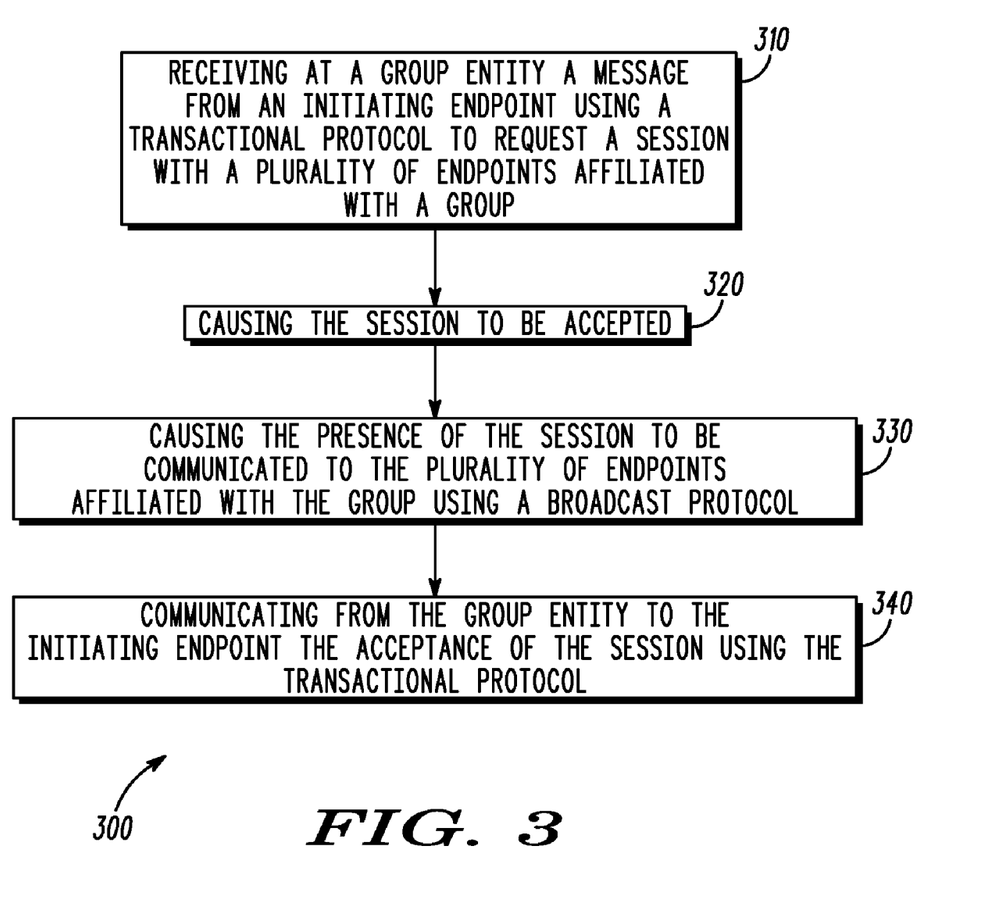
FIG. 3 is a flow diagram illustrating a method for establishing group communications between a plurality of endpoints in a system, in accordance with the present invention.

FIG. 3 is a flow diagram illustrating a method 300 according to the present invention for establishing group communications in a system having at least one group entity and a plurality of endpoints. Method 300 comprises: step 310 of receiving in a group entity from an initiating endpoint, using a transactional protocol, a message requesting a session between a plurality of endpoints affiliated with a group that correlates to said group entity; step 320 of causing the session to be accepted; step 330 of causing the presence of the session to be communicated, using a broadcast protocol, to the plurality of endpoints affiliated with the group; and step 340 of communicating by the group entity to the initiating endpoint the acceptance of the session using the transactional protocol. The details of steps 310 through 340 according to a preferred embodiment of the present invention will now be described by reference to FIGS. 4-6.

Figure 4:
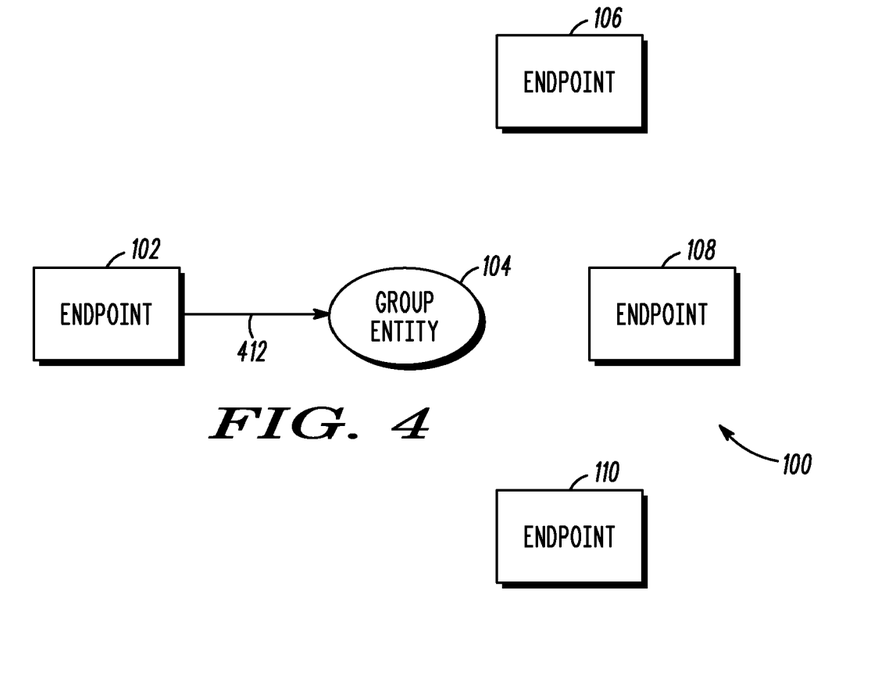
FIG. 4 is a block diagram illustrating an endpoint initiating a session with a plurality of endpoints affiliated with a group via the group entity correlating to this group, in accordance with the present invention.

FIG. 4 illustrates endpoint 102 initiating, via group entity 104, a session with the endpoints affiliated with group 1, in accordance with the present invention. To initiate the session, initiating endpoint 102 preferably sends a SIP INVITE message addressed to group entity 104, as illustrated by arrow 412 from endpoint 102 to group entity 104. A session description is carried in the payload of the SIP INVITE message and is used to describe any requested session parameters. Typically, the session description for a given group communication contains any one of a single media stream, multiple media streams, or multiple synchronized media streams (e.g., QuickTime). For instance, the session description could indicate that the user desires to start a session with an H.263 video stream and an IMBE audio stream. In such a case, the SIP INVITE would initiate the establishment of a single multimedia stream within a group communication, wherein preferably each media stream is established through a unique SIP call leg. Alternatively, a single SIP call may be used to establish both media streams.

A suitable tag-value type or schema-based protocol is used for describing session parameters. In a preferred embodiment of the present invention, a SDP packet is used for session descriptions. The SDP packet may, for instance, describe all of the media streams that correspond to the same session. The session description for each stream may also be bundled into the same SDP packet to make it easier for the endpoints to associate the streams together to logically form a single session. Moreover, one of the advantages of using SDP for session descriptions is that this protocol may be extended to carry new information specific to sessions in a given system.

Once group entity 104 receives the SIP INVITE 412, group entity 104 will cause the session to be accepted or declined. Group entity 104 will coordinate with any other entity in the system, as needed, to make this determination. If group entity 104 accepts the session, a set of session parameters must first be selected (resolved). Again, group entity 104 will coordinate with any other entity in the system, as needed, to cause a suitable set of session parameters to be selected.

As stated above, SIP INVITE 412 may contain requested parameters. In this case, the set of selected session parameters is preferably, but not necessarily, at least a subset of the requested parameters if all of the requested parameters cannot be accommodated. However, whether INVITE 412 contains requested parameters or not, group entity 104 may be configured to cause session parameters to be selected as a function of a number of factors, including but not limited to: (1) available system resources such as the available bandwidth, the available media resources, e.g., transcoding, policies, e.g., this group always uses high resolution video, and critical users; (2) a capabilities list for all of the endpoints affiliated with group 1, which is made available through the registration process described above; and (3) one or more sets default parameters known to group entity 104. At a minimum, if the session is accepted, the required data and possible control channels are established. Thereafter, group entity 104 causes the set of selected session parameters to be entered into a SAP session directory. Conversely, if group entity 104 declines the session (not illustrated), group entity 104 communicates this to the initiating endpoint 102 preferably by sending an error message using the transactional protocol, e.g. SIP.

Figure 5:
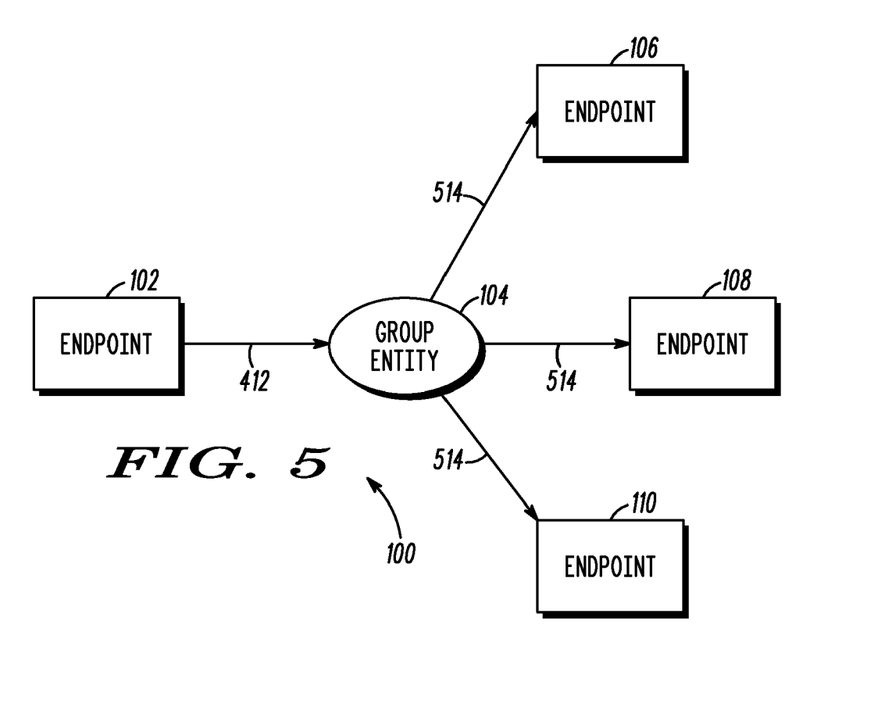
FIG. 5 is a block diagram illustrating SAP announcements being sent to the endpoints affiliated with the group, in accordance with the present invention, to communicate the presence of the session.

Assuming group entity 104 accepts the session initiated by the SIP INVITE 412 from endpoint 102, the presence of the session would then need to be communicated to the endpoints affiliated with group 1. FIG. 5 illustrates group entity 104 using a broadcast protocol to communicate the presence of the session and the selected session parameters to endpoints 106, 108 and 110. Group agent 104 transmits SAP announcements to endpoints 102, 106, 108 and 110 (arrows 514) on an assigned multicast channel using Internet Protocol ("IP") multicast. Each group in the system, preferably but not necessarily, has a unique multicast address for signaling, which may be selected by group entity 104.

The SAP announcements can be constructed to carry the identification of the group for which the announcement is intended as well as a session description. Specialized media control information can be identified through specialized media types in this session. Separating media control information from session control signaling improves functional layering within the system. Preferably, each SAP announcement carries in its payload an SDP packet describing the selected session parameters. Traditionally, in accordance with the standard, SAP announcements are sent out on a relatively long periodic basis to announce sessions that will be taking place at some time in the future, much like an active TV Guide instructing someone to tune in to channel 7 at 8:00 PM on June $23^{rd}$ to see a particular program. However, in accordance with the present invention, SAP announcements are sent contemporaneously with the start of a session and are preferably repeated to increase the probability of the endpoints receiving them in a short time window. A reliable multicast technology may alternatively be used to verify receipt of the SAP announcements. Moreover, the SAP announcements are periodically multicast for the life of the session.

Figure 6:
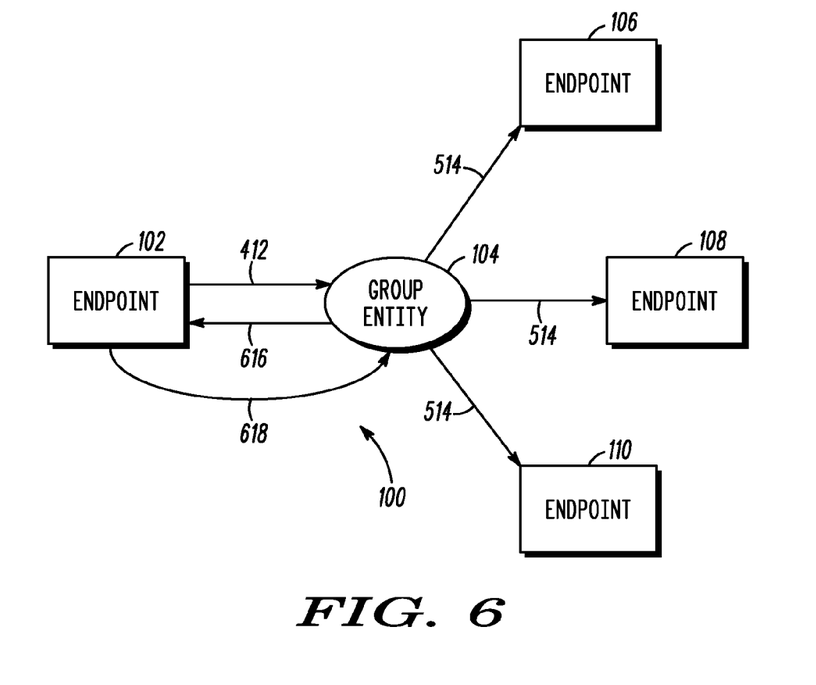
FIG. 6 is a block diagram illustrating the group entity communicating the acceptance of the session to the initiating endpoint, in accordance with the present invention.

The acceptance of the session must also be communicated to the initiating endpoint using the transactional protocol. FIG. 6 illustrates group entity 104 communicating the presence of the session and the selected session parameters to initiating endpoint 102. Group entity 104 preferably acknowledges the acceptance of the session by sending a SIP OK (illustrated by arrow 616) to endpoint 102. This SIP OK preferably carries in its payload a SDP packet that describes the selected session parameters. In response, endpoint 102 sends a SIP ACK (illustrated by arrow 618) to group entity 104. At this point, the session INVITE/OK/ACK transaction is complete, and all endpoints 102, 106, 108 and 110, affiliated with group 1, have been notified of the session and the selected session parameters. Although FIGS. 5 and 6 illustrates the preferred embodiment, wherein SAP announcements are sent out prior to group entity 104 communicating the acceptance of the session to the initiating endpoint 102, those of ordinary skill in the art will realize that these two steps may occur in the reverse order.

Once a session is established according to the present invention, users of the system may desire to have one or more of the following termination requests implemented: a request by any of the endpoints to terminate the session for all endpoints in the session; a request by any of the endpoints joined to the session to leave the session, while the session remains active; or a request by any of the endpoints to end only a SIP control dialog (i.e., a call leg) between the endpoint and the system that is no longer needed, while the session remains active. The session or a particular call leg may also be terminated automatically by the system where, for instance, the session or call leg has been idle for a predetermined amount of time or at the expiration of a hang-timer in the system. Such termination requests are communicated, in accordance with the present invention, preferably by transmitting a SIP BYE message.

Figure 7:
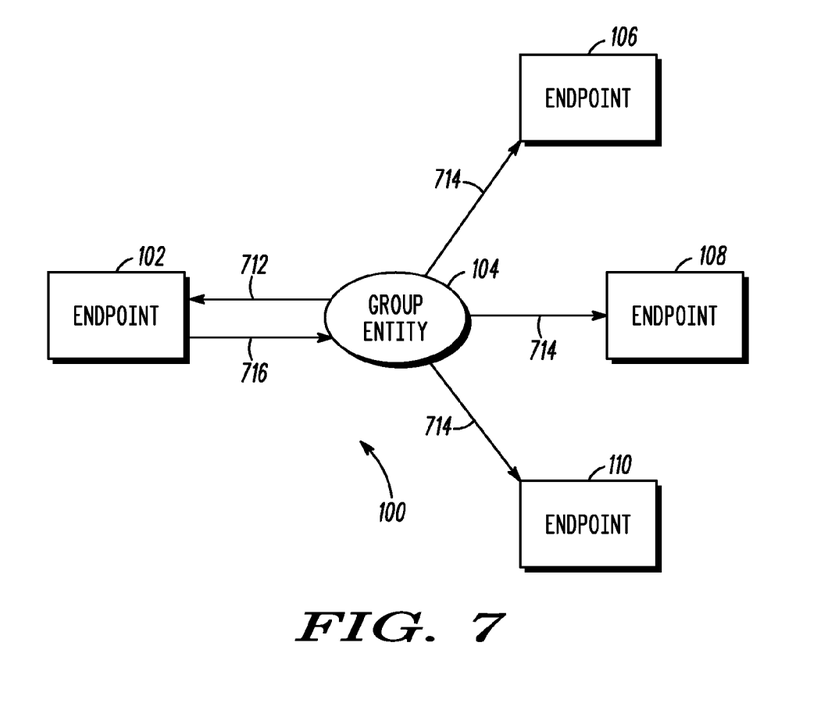
FIG. 7 is a block diagram illustrating the group entity terminating the session, in accordance with the present invention.

FIGS. 7 illustrates group entity 104 terminating the media session established between the endpoints affiliated with group 1, in accordance with the present invention. To terminate the session, group entity 104 sends a SIP BYE (illustrated by arrow 712) to endpoint 102, which has at least one SIP call leg in place. Group entity 104 may terminate the session, for instance, in response to the expiration of a system timer. This BYE message indicates that the request is to terminate the session for all endpoints, including all corresponding call legs. To communicate the session termination to endpoints 106, 108 and 110, group entity 104 preferably immediately sends out SAP announcements (also referred to as "deletion announcements") to these endpoints (illustrated by arrows 714). These deletion announcements are preferably repeated to increase the probability of the endpoints receiving them in a short time window. A reliable multicast technology may alternatively be used to verify receipt of the SAP announcements. Endpoint 102 then sends a SIP OK to group entity 104 (arrow 716) to complete the session termination.

Figure 8:
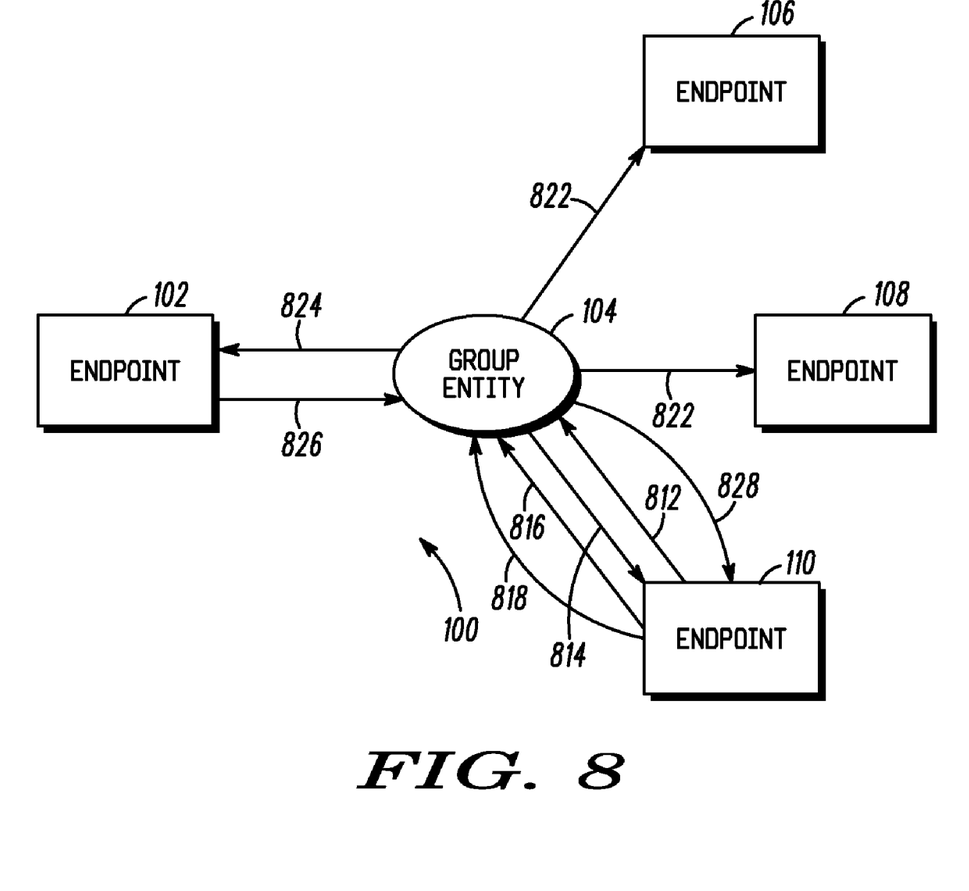
FIG. 8 is a block diagram illustrating an endpoint affiliated with the group terminating the session, in accordance with the present invention.

Any one of the endpoints affiliated with group 1 may also terminate the established session. FIG. 8 illustrates endpoint 110 terminating the session, in accordance with the present invention. Such an implementation of the present invention may be useful, for instance, where an officer initiates a session from his vehicle to a dispatch endpoint and several other endpoints in a group and then leaves his vehicle. Another user, e.g., a dispatcher, might want to end the session rather than require the officer to return to the vehicle to end the session. To terminate the session, endpoint 110 must first establish a SIP call dialog with group entity 104 through the use of a standard SIP INVITE/OK/ACK transaction (illustrated respectively by arrows 812, 814 and 816). Once this SIP call dialog with group entity 104 is in place, endpoint 110 may end the session in a similar manner discussed above by reference to FIG. 7 illustrating endpoint 102 terminating the session. Specifically, endpoint 110 would first send a SIP BYE message to group entity 104 (as illustrated by arrow 818). Group entity 104 would then send SAP deletion announcements to endpoints 106 and 108 (arrows 822) that were receiving broadcast announcements. However, since initiating endpoint has a SIP control dialog in place with endpoint 102, this endpoint is notified of the session termination via a SIP BYE request (arrow 824), wherein endpoint 102 responds with a SIP OK (arrow 826). Finally, the session termination is completed by group entity 104 sending a SIP OK message to endpoint 110 (arrow 828).

Furthermore, an established session can be modified by any of the endpoints affiliated with group 1. For instance, one or more endpoints may wish to change session parameters such as bit rates, codecs, encryption, etc., or may wish to add or remove media streams. An endpoint preferably modifies a session by sending a SIP RE-INVITE message addressed to the appropriate group that contains a SDP packet in its payload that describes the modified session parameters. For endpoints that do not have a call leg already in place, i.e., receiving only broadcast announcements, the endpoint must first establish a SIP control dialog through a typical SIP INVITE/OK/ACK transaction. Thereafter, the group entity notifies all endpoints with a SIP dialog in place of the modified session parameters through SIP signaling and notifies the other endpoints in the group of the modified session parameters through repeated SAP announcements.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described, wherein SIP, SAP and SDP protocols were used to implement the present invention. Various alterations, modifications and variations will be apparent to those skilled in the art in light of the foregoing description, which include but are not limited to implementing the present invention using other transactional, broadcast or session description protocols. In addition, the present invention does not preclude the use of standard SIP devices, such as telephones. Thus, it should be understood that the invention is not limited by the foregoing description, but embraces all such alterations, modifications and variations in accordance with the spirit and scope of the appended claims.

What is claimed is:

1. In a system having at least one group entity and a plurality of endpoints, a method comprising the steps of:
    a) receiving at a group entity from an initiating endpoint, using a transactional protocol, a first message requesting an initiation of a session between a plurality of endpoints affiliated with a group that correlates to said group entity;
    b) causing said session to be accepted in order to start the session;
    c) upon the acceptance and start of the session, causing the presence of said session to be communicated, using a broadcast protocol, to the plurality of endpoints affiliated with said group; and
    d) communicating from said group entity to said initiating endpoint, using said transactional protocol, the acceptance of said session.

2. The method according to claim 1 further comprising the step of receiving at said group entity from any one of the plurality of endpoints affiliated with said group, using said transactional protocol, at least one subsequent message requesting that said session be modified.

3. The method according to claim 1 further comprising the step of causing said session to be terminated using said transactional protocol.

4. The method according to claim 3, wherein said group entity sends a subsequent message to any one of the plurality of endpoints affiliated with said group to cause said session to be terminated.

5. The method according to claim 4, wherein said group entity causes the session to be terminated as a function of the expiration of a system timer.

6. The method according to claim 3, wherein said group entity receives at least one subsequent message from any one of the plurality of endpoints affiliated with said group to cause said session to be terminated.

7. The method according to claim 1 further comprising the step of causing a set of session parameters to be selected before the session is accepted.

8. The method according to claim 7, wherein said first message includes a set of requested parameters, and said set of session parameters is selected from at least a portion of said set of requested parameters.

9. The method according to claim 7, wherein said set of requested parameters is described using a Session Description Protocol (SDP).

10. The method according to claim 7, wherein said set of session parameters is selected as a function of available system resources.

11. The method according to claim 7, wherein said set of session parameters is selected as a function of capabilities of each endpoint affiliated with said group.

12. The method according to claim 7, wherein said set of session parameters is selected as a function of at least one set of default parameters.

13. The method according to claim 1, wherein said transactional protocol is a Session Initiation Protocol (SIP).

14. The method according to claim 1, wherein said broadcast protocol is a Session Announcement Protocol (SAP), and the presence of the session is communicated, using SAP announcements, to the plurality of endpoints affiliated with said group.

15. The method according to claim 14, wherein said SAP announcements are repeated at least once.

16. The method according to claim 1, wherein said broadcast protocol is transported using Internet Protocol (IP) multicast.

17. The method according to claim 16, wherein each group entity in said system is associated with a multicast address that is different from the multicast address of any other group entity in the system.

18. In a system having at least one group entity and a plurality of endpoints, a method comprising the steps of:
    a) receiving at a group entity from an initiating endpoint, using a transactional protocol, a first message requesting an initiation of a session between a plurality of endpoints affiliated with a group that correlates to said group entity;

b) determining whether said session is to be accepted in order to start the session or declined and if said session is declined communicating from said group entity to said initiating endpoint, using said transactional protocol, that the session was declined, and if said session is accepted performing steps c) and d);

c) upon the acceptance and start of the session, causing the presence of said session to be communicated, using a broadcast protocol, to the plurality of endpoints affiliated with said group; and d) communicating from said group entity to said initiating endpoint, using said transactional protocol, the acceptance of said session.

19. A communications network system comprising:

a plurality of endpoints operatively networked together, each said endpoint configured for communicating using a transactional protocol and further configured for receiving communications using a broadcast protocol, and at least one group entity operatively coupled to the system and configured for receiving from an initiating endpoint, using a transactional protocol, a first message requesting an initiation of a session between a plurality of endpoints affiliated with a group that correlates to said group entity, causing said session to be accepted in order to start the session, upon the acceptance and start of the session causing the presence of said session to be communicated, using a broadcast protocol, to the plurality of endpoints affiliated with said group, and-communicating from said group entity to said initiating endpoint, using said transactional protocol, the acceptance of said session.

\* \* \* \* \*